J. S. DUNCAN.
ORE-WASHERS.
No. 194,810. Patented Sept. 4, 1877.
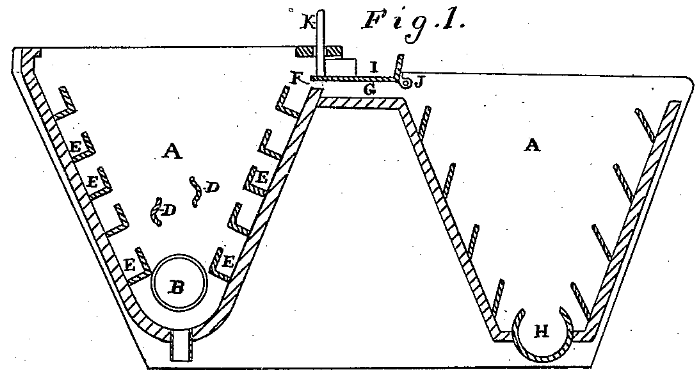
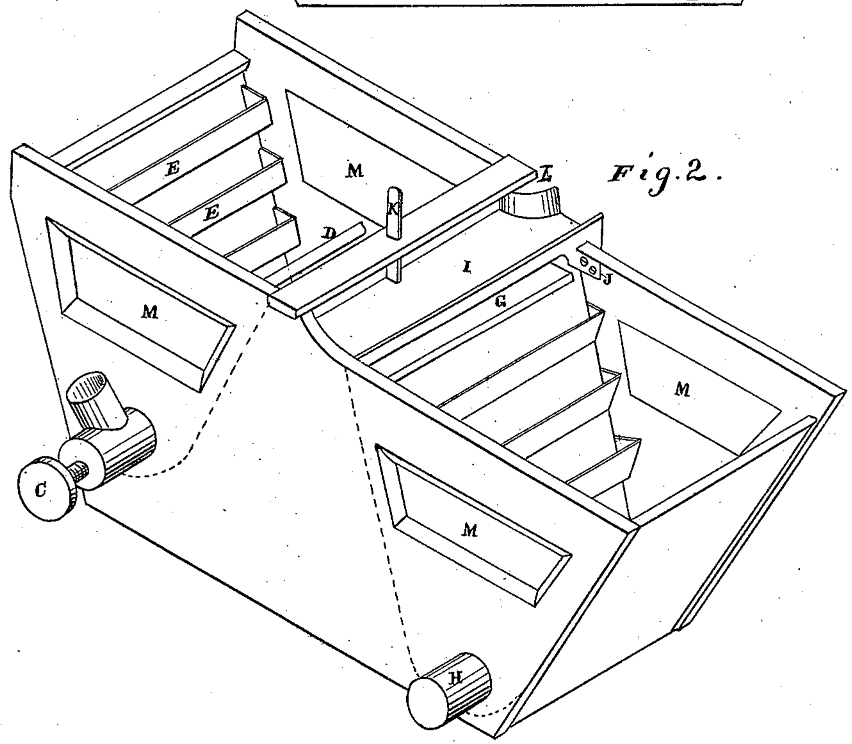
Witnesses
Geo. H. Strong
Jno. L. Boone
Inventor
Joseph S. Duncan
by Dewey & Co
Attys.
N. PETERS, PHOTO-LITHOGRAPHER, WASHINGTON, D. C.

UNITED STATES PATENT OFFICE.

JOSEPH S. DUNCAN, OF SAN FRANCISCO, CALIFORNIA, ASSIGNOR OF ONE-FOURTH HIS RIGHT TO EDWARD E. COOK, OF SAME PLACE.

IMPROVEMENT IN ORE-WASHERS.

Specification forming part of Letters Patent No. 194,810, dated September 4, 1877; application filed March 15, 1877.

*To all whom it may concern:*

Be it known that I, JOSEPH S. DUNCAN, of the city and county of San Francisco and State of California, have invented an Improved Concentrator; and I do hereby declare the following to be a full, clear, and exact description thereof, reference being had to the accompanying drawings.

My invention relates to an improvement in concentrators, such as are employed to separate the valuable metalliferous particles and sulphurets from the refuse portions of ores; and it consists of one or more vessels or chambers of a peculiar shape, into which the pulp is introduced, and, as the heavier particles fall toward the bottom, they are met by a body of water, which is given a rotary motion as it flows upward, and by its effect causes the different grades in weight to settle into a series of receptacles extending down the sides of the vessel or series.

Referring to the accompanying drawings for a more complete explanation of my invention—

Figure 1 is a longitudinal section of my machine, showing two chambers. Fig. 2 is a perspective view.

A A are chambers, which are built of any suitable material, and as many may be employed as the nature of the material and the difficulty in separating and concentrating it require. These chambers are made triangular in cross-section, as shown, with the apex or smaller portion down, and their length between the vertical sides may be as great as necessary.

At the bottom of the first chamber is a tube, B, extending from side to side, and this tube is perforated or made open, so as to permit a free flow of water upward. The ingress of water is controlled by a suitable cock or valve, C, as shown.

At suitable points above the tube B, I place peculiar concavo-convex bars D, which extend across the chamber, and by their shape they cause the water to take a peculiar rotary motion as it flows upward. This motion holds the particles in suspension, and prevents their settling to the bottom. It also carries them toward the inclined sides, where pockets E E are arranged from the bottom upward, as shown; and into these pockets the sulphurets, metals, and valuable heavy portions will settle, according to their gravity.

The pulp, reduced to a proper consistency with water, is allowed to flow into the chamber in a broad sheet at the mouth F, and the heaviest particles will be at once caught by the upper pockets E directly beneath the entrance. The remainder will be agitated, and settle, as before described.

The outlet consists of a trough, G, extending across the full width of the chamber, and leading to the second chamber, which has a similar arrangement of parts, as shown. The water-supply tube H of this chamber may be perforated, as described, for the tube B, or it may be simply slotted in one or more places, the object being to produce an upwardly-flowing body of water to meet the material as it settles, and hold it in suspension so as to deposit different grades in the pockets *e* of the chamber.

Above the trough G is a secondary trough, I, which is hinged to the sides of the frame or box at the end J, opposite its opening toward the chamber A. The front end has an arm, K, with a screw or other device operated from above, so as to elevate or depress this trough.

When raised to a considerable height, it will be seen that all the material will flow from the first to the second chamber through the trough G beneath the trough I; but when depressed the mouth of this secondary trough will receive more or less of the lighter portion, and discharge it from the side opening L.

By this construction I am enabled to regulate the flow of the material from one chamber to the other with great nicety, and more or less of it may be subjected to a second operation, according to the difficulty of working it, and the necessity of the second operation.

The sides of the chambers may have glazed openings M, so that the contents may be inspected and the progress of the operation determined.

Having thus described my invention, what I claim as new, and desire to secure by Letters Patent, is—

1. The chambers A, with their inclined sides provided with the series of pockets E E, for receiving and grading the particles according to their weight as they settle through the chamber, substantially as herein described.

2. The inclined-sided chambers A, with their receiving and separating pockets E, in combination with the perforated or slotted pipes B H, with valves C, whereby a graduated upward current of water is produced to hold the particles in suspension and regulate their deposit, substantially as described.

3. In combination with the chambers A, with their inclined sides and pockets E, and the water-supplying tubes B H, the peculiarly-shaped bars D, for producing a rotary upward current to assist in separating and depositing the particles, substantially as herein described.

4. The concentrating-chambers A, with their pockets E, water-tubes B H, and bars D, said chambers being perforated and glazed at M, substantially as herein described.

In witness whereof I have hereunto set my hand and seal.

JOSEPH S. DUNCAN. [L. S.]

Witnesses:

GEO. H. STRONG,

FRANK A. BROOKS.